(12) United States Patent
Ganapathi et al.

(10) Patent No.: US 11,394,807 B2
(45) Date of Patent: *Jul. 19, 2022

(54) CRITICAL PATH ESTIMATION FOR ACCELERATED AND OPTIMAL LOADING OF WEB PAGES

(71) Applicant: salesforce.com, inc., San Francisco, CA (US)

(72) Inventors: Tejaswini Ganapathi, San Francisco, CA (US); Kartikeya Chandrayana, San Francisco, CA (US); Satish Raghunath, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,492

(22) Filed: May 10, 2021

(65) Prior Publication Data
US 2021/0266384 A1    Aug. 26, 2021

Related U.S. Application Data

(63) Continuation of application No. 16/775,834, filed on Jan. 29, 2020, now Pat. No. 11,076,023.

(51) Int. Cl.
*H04L 67/01* (2022.01)
*H04L 67/133* (2022.01)
(Continued)

(52) U.S. Cl.
CPC .......... *H04L 67/42* (2013.01); *G06F 16/958* (2019.01); *G06F 16/986* (2019.01);
(Continued)

(58) Field of Classification Search
CPC ....... H04L 67/42; H04L 43/062; H04L 67/40; H04L 41/083; H04L 41/145; H04L 41/147; H04L 43/045; H04L 43/16; H04L 67/02; H04L 67/125; H04L 43/08; H04L 67/10; H04L 69/40; H04L 41/046; G06F 16/958; G06F 16/986
See application file for complete search history.

(56) References Cited

U.S. PATENT DOCUMENTS 5,860,074 A    1/1999    Rowe et al.
10,033,656 B2  7/2018    Kravchik et al.
(Continued)

OTHER PUBLICATIONS

U.S. Appl. No. 16/775,834, Non-Final Office Action dated Dec. 3, 2020.
(Continued)

*Primary Examiner* — Arvin Eskandarnia
*Assistant Examiner* — Chhian (Amy) Ling
(74) *Attorney, Agent, or Firm* — Wong & Rees LLP; Zhichong Gu

(57) ABSTRACT

Network requests are made to download a data object for a display page with different time delays. Page load outcomes of the display page are determined. A criticality of downloading the data object with respect to the display page is determined using page load outcomes. Criticalities of data objects of the display page are used to generate a specific data object download order that prioritizes critical and/or blocking objects of the display page.

20 Claims, 7 Drawing Sheets

(51) Int. Cl.
  *H04L 43/062* (2022.01)
  *G06F 16/958* (2019.01)
  *H04L 67/02* (2022.01)
  *H04L 43/16* (2022.01)
  *H04L 41/147* (2022.01)
  *H04L 41/14* (2022.01)
  *H04L 67/125* (2022.01)
  *H04L 43/045* (2022.01)
  *H04L 41/083* (2022.01)
  *H04L 43/08* (2022.01)

(52) U.S. Cl.
  CPC .......... *H04L 41/083* (2013.01); *H04L 41/145* (2013.01); *H04L 41/147* (2013.01); *H04L 43/045* (2013.01); *H04L 43/062* (2013.01); *H04L 43/16* (2013.01); *H04L 67/02* (2013.01); *H04L 67/125* (2013.01); *H04L 67/40* (2013.01); *H04L 43/08* (2013.01)

(56) References Cited

U.S. PATENT DOCUMENTS

| | | | |
|---|---|---|---|
| 10,375,192 | B1 | 8/2019 | Lepeska |
| 10,924,574 | B2 | 2/2021 | Wei et al. |
| 10,944,631 | B1* | 3/2021 | Ganapathi ............... H04L 67/02 |
| 11,256,775 | B1* | 2/2022 | Lepeska ............... G06F 16/9574 |
| 2013/0055063 | A1* | 2/2013 | Mondal ................. G06F 9/4552 |
| | | | 715/234 |
| 2016/0344649 | A1* | 11/2016 | Kravchik .............. G06F 16/958 |
| 2018/0217964 | A1 | 8/2018 | Lin et al. |
| 2019/0230186 | A1 | 7/2019 | Yellin et al. |
| 2021/0234942 | A1 | 7/2021 | Ganapathi et al. |

OTHER PUBLICATIONS

U.S. Appl. No. 16/775,834, Notice of Allowance dated Mar. 16, 2021.

* cited by examiner

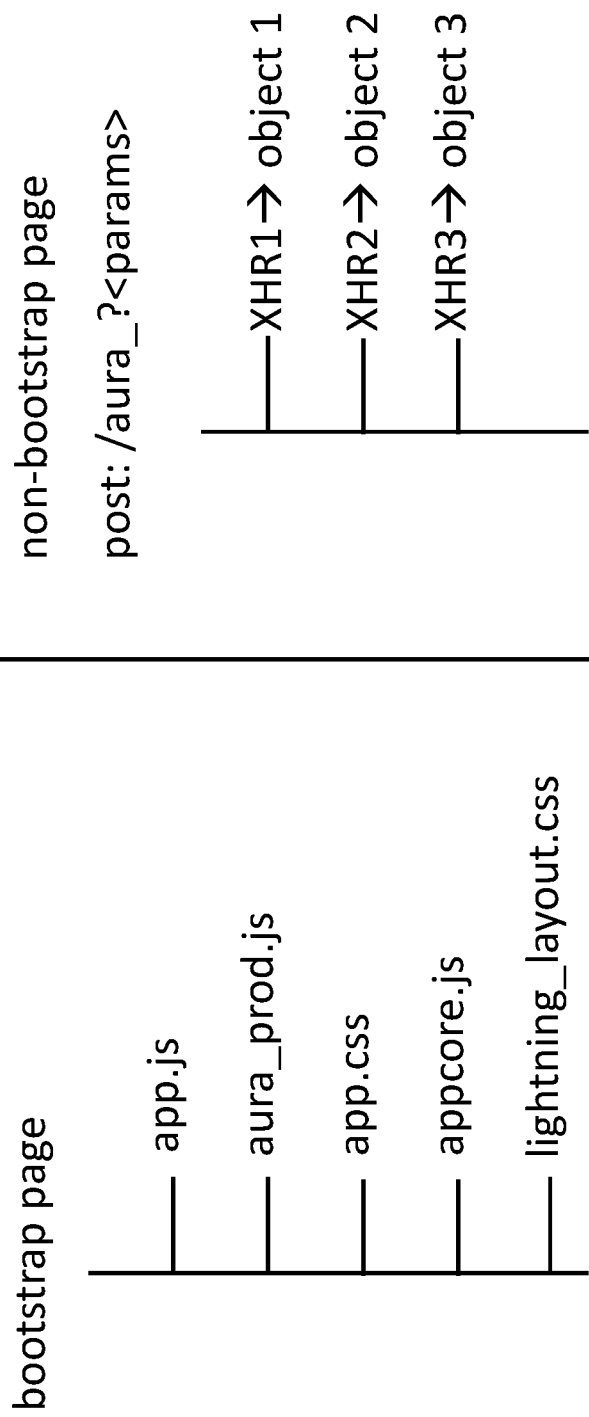

CRITICAL PATH ESTIMATION FOR ACCELERATED AND OPTIMAL LOADING OF WEB PAGES

CROSS-REFERENCE TO RELATED APPLICATIONS

This application is a Continuation of U.S. patent application Ser. No. 16/775,834 filed Jan. 29, 2020, now U.S. Pat. No. 11,076,023 issued Jul. 27, 2021, the contents of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNOLOGY

The present invention relates generally to optimizing content delivery, and in particular, to critical path estimation for accelerated and optimal loading of web pages.

BACKGROUND

A computing system may be tasked to process massive volumes of network requests and corresponding data downloads in connection with web pages and/or computer applications involving many different computing nodes and networks. Loading a web page may involve making data download requests to remotely located servers in the computing system and downloading many data objects such as images, style sheets, scripts, codes, audio streams, video streams, and so forth, from these servers.

Data objects needed for a web page to render or operate may include cached data objects, non-cached objects, static content, dynamic content, etc., some of which may be static files identifiable or retrievable with Uniform Resource Locators (URLs), whereas some others of which may be dynamically generated in real time in response to URLs, API calls and web-based messages. Network optimization strategies adopted by computing nodes and networks involved in data downloads—or a lack thereof—can significantly affect overall performance and user experience of a web page or an associated computer application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2B and FIG. 2C illustrate example data objects for visually depicting/rendering display pages;

DESCRIPTION OF EXAMPLE EMBODIMENTS

Figure 1A:
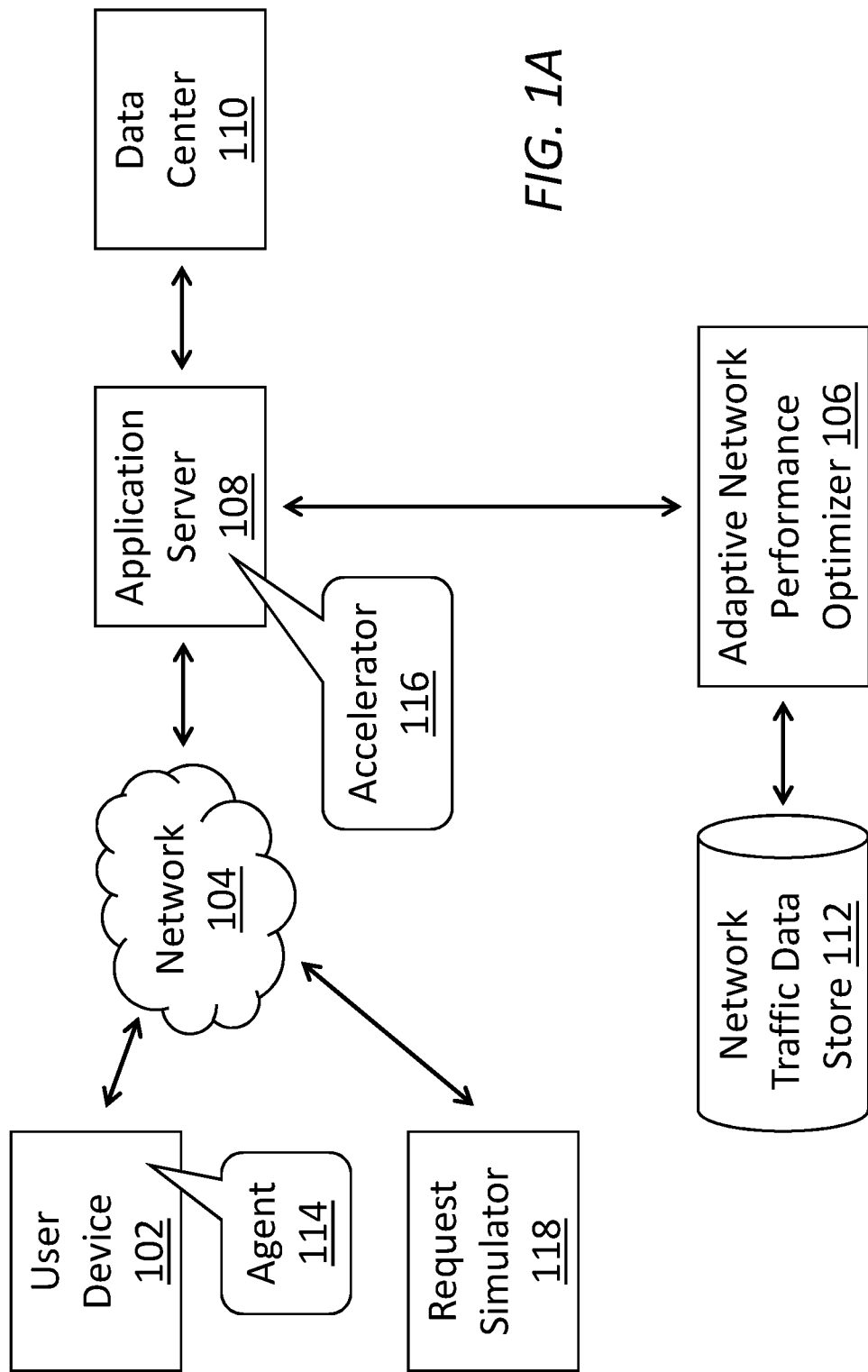
FIG. 1A illustrates a high-level block diagram for a network performance optimization system.

Example embodiments, which relate to critical path estimation for accelerated and optimal loading of web pages, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. NETWORK OPTIMIZATION
3. MEASURING CRITICALITIES
4. EXAMPLE DISPLAY PAGES AND DATA OBJECTS
5. PRIORITIZING CRITICAL OBJECTS FOR DOWNLOADING
6. NETWORK OPTIMIZATION INCORPORATING CRITICALITY INFORMATION
7. EXAMPLE EMBODIMENTS
8. IMPLEMENTATION MECHANISMS—HARDWARE OVERVIEW
9. EQUIVALENTS, EXTENSIONS, ALTERNATIVES AND MISCELLANEOUS

1. GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Modern data transport networks feature a huge variety of network technologies, end-user devices, and software. Some of the common network technologies include wired networks, cellular networks (e.g., LTE, HSPA, 3G, older technologies, etc.), WiFi (e.g., 802.11xx series of standards, etc.), satellite, microwave, etc. In terms of devices and software, there are smartphones, tablets, personal computers, network-connected appliances, electronics, etc., that rely on a range of embedded software systems such as Windows, Apple iOS, Google Android, Linux, and several other specialized operating systems.

Many of these network technologies feature a volatile wireless last mile. The volatility manifests itself in the application layer in the form of variable bandwidth, latency, jitter, loss rates and other network related impairments. The diversity in devices, operating system software and form factors result in a unique challenge from the perspective of user experience. The nature of content that is generated and consumed on these devices is quite diverse. The new content is very dynamic and personalized.

A consequence of these characteristics is that end-users and applications experience inconsistent and poor performance Client and server software systems may be best deployed in a stable operating environment where operational parameters either change a little or do not change at all. When such software systems see unusual network feedback or interaction, they tend to over-react in terms of remedies.

A display page rendered with a computer application or a web browser in a user device can involve downloading many data objects from servers. These data objects may be used for rendering operations as well as non-rendering operations associated with the display page and/or user interface (UI) components therein.

Under other approaches, data objects for a display page may be downloaded as specified in code/script written by a developer without actually having sufficient information about how the display page would operate in actual networks and systems a priori. Thus, usability of the display page could be relatively easily broken if some of the data objects would not be downloaded properly or not downloaded in time.

By way of comparison, under techniques as described herein, information about how a display page would operate is collected and analyzed to determine what data objects are critical data objects, what data objects are block data objects, what data objects are non-essential data objects, etc. Impacts on usability of the display page from various data objects are determined or estimated by criticality information of the data objects. As a result, the data objects of the display page can be downloaded in a specific order that minimizes or avoids adverse impacts from any problems in downloading the data objects.

For example, network requests may be made to download data objects—used by a display page for rendering and operations—from application server(s) of a computer system such as a multitenant hosting computing system that hosts a relatively large number of organizations. The network requests are made of subsets of network requests made to download each of the data objects. A specific subset of network requests for downloading a specific data object may be set with different time delays (e.g., from zero or little time delay to infinite delay, etc.) in a range of different time delays. Impacts to the display page from the specific data object with the different time delays are measured and/or determined and/or annotated. In some operational scenarios, while network requests for a data object of the display page are being made and/or processed with different (e.g., extra, inserted, etc.) time delays, other network requests for other data objects of the same display page may be made and/or processed as usual and with no or little (e.g., extra, inserted, etc.) time delays.

From results and outcomes of the network requests and corresponding download outcomes of each of the data objects with different time delays, criticalities of each data object among all the data objects of the web page may be assessed, estimated and/or determined. The criticalities can then be used to set a specific data object download order for downloading the data objects of the display page, which download order prioritizes critical data objects and/or blocking data objects for downloading.

As a result, critical and/or blocking data objects that would adversely impact or block other data objects from being downloaded successfully and that would adversely impact or block the display page from rendering or proper operations may be downloaded first to avoid or minimize adverse impacts from not downloading the blocking data objects in time.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. NETWORK OPTIMIZATION

The network performance of data delivery for user devices to send network requests to web applications and receive data downloads corresponding to the network requests is closely tied to network optimization policies/strategies with which the user devices, application servers and other involved devices are operating. A network optimizer as described herein dynamically adapts to different network requests and data downloads and picks the best network optimization policies/strategies that take into account underlying criticalities of data objects for display pages and computer applications. A network request as described herein may refer to a data request for retrieving or downloading one or more data objects from one or more servers located remotely across one or more networks. In some operational scenarios in which data objects are cached, a network request may also refer to a data request that is satisfied with cached data objects. Example network requests may include, but are not necessarily limited to only, any of: HTTP requests, RESTful API calls, XML HTTP requests, application programming interface (API) calls, etc.

The network optimizer may be implemented to recommend, but is not limited to, any combination of: end-device based data delivery strategies and accelerator-based data delivery strategies based at least in part on information about individual criticalities of data objects of a display page.

Network optimization policies or strategies refer to optimization methods and/or (optimized) operational parameters (e.g., network or TCP parameters, etc.) deployed or implemented by a network request origination device such as a user device and/or a network request simulator to request, receive or, transmit data or data object(s) over the network. These network optimization policies or strategies include, but are not limited to, any combination of: optimized values of one or more network or TCP parameters to propagate to network request origination devices and/or network request processing devices for implementation on the network request origination devices and/or the network request processing devices to be used in future network requests and future data downloads corresponding to the future network requests. Various methods of optimizing data delivery are described in U.S. Patent Publication No. 2014/0304395, entitled "Cognitive Data Delivery Optimizing System," filed Nov. 12, 2013, and which is hereby incorporated by reference in its entirety for all purposes. Embodiments are not tied down by assumptions on the current nature of the system.

FIG. 1A and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g. "102" in the text refers to reference numerals "102a," and/or "102b" in the figures). Only one user device 102 (end-devices as described above) is shown in FIG. 1A in order to simplify and clarify the description.

As illustrated in FIG. 1A, a system 100 includes a user device 102 that communicates network requests through a network 104. In some operational scenarios, system 100 includes a network request simulator 118 that communicates simulated network requests through network 104. An application server 108 may receive the network requests—as originated from user devices and/or network request simulators over network 104—and communicate the requests to a data center 110.

Example application servers may include but are not necessarily limited to only, any of: application servers operating in conjunction with or without web servers and/or backend servers, application servers handling bypass traffic and/or accelerated traffic, proxy servers acting as proxies for some or all of application servers and/or backend servers, and so forth. The network optimizer 106 may gather network traffic data from the application server 108 and store the network traffic data in the network data traffic store 112, in an embodiment.

Example network traffic data may include, but is not necessarily limited to only, network traffic data of data values used with network requests made by network request origination devices, page load data of performance measurements of web/application page loadings on the network request origination devices, download outcomes of performance data of data (object) downloads initiated by the network requests, etc.

Network traffic may refer to network requests sent by user devices and/or network request simulators to application servers and/or data (object) downloads, as requested by the network requests, from the application servers to the user devices and/or the network request simulators.

After or concurrently while a page load or data download (e.g., with respect to each data object of a web page, with respect to a group of data objects, etc.) is processed and/or completed, statistics of data sizes, times, etc., may be logged as raw network traffic data comprising database records representing raw traffic data records. Each raw traffic data record may include performance metrics derived from or recorded in the statistics. In an example, page load (performance) data such as some or all of page load throughputs, page load status (e.g., binary, etc.), page load (complete) times in units of time such as seconds or milliseconds, page load times to first byte, etc., may be captured in each database record representing a raw traffic data record in the network data traffic store 112 for each network request and/or for a web page corresponding to the network request. In another example, download outcomes such as some or all of download throughputs, download complete times, and download times to first byte, etc., may be captured in each database record representing a raw traffic data record in the network data traffic store 112 for each network request or data downloads corresponding to each such network request.

In some operational scenarios, additional information may also be included in each database record or network traffic data record, in other embodiments. Typical sources of data relating to the network environment are elements in the network infrastructure that gather statistics about transit traffic as well as user devices and/or network request simulators that connect to the network as clients or servers. The additional information includes, but is not limited to, any combination of: data pertaining to requests for objects, periodic monitoring of network elements (which may include inputs from external source(s) as well as results from active probing), exceptional events (e.g., unpredictable, rare occurrences, etc.), data pertaining to the devices originating or servicing requests, data pertaining to the applications associated with the requests, data associated with the networking stack on any of the devices/elements that are in the path of the request or available from any external source, etc.

In an embodiment, the network request simulator 118 may be installed on a (e.g., a dedicated, a multi-purposed, etc.) test computing device, which may be separate from a user device—e.g., actually operated by a user of a computer application as described herein—such as 102 of FIG. 1.

In an embodiment, a module/component such as an agent 114 may be installed in a network request origination device such as the user device 102 and/or the network request simulator 118 to provide inputs about the real-time operating conditions, participates and performs active network measurements, and executes recommended strategies with actual or synthetic network requests. The agent 114 may be supplied in a software development kit (SDK) and installed on the user device 102 and/or the network request simulator 118 when an application that includes the SDK is installed on the user device 102.

Additionally, optionally or alternatively, in an embodiment, the network request simulator 118 may be supplied in the software development kit (SDK) and installed on the user device 102. For example, in some operational scenarios, the network request simulator 118 may be collocated with the user device 102 as a part of the agent 114.

By incorporating an agent 114 in or with the network request origination device to report the observed networking conditions back to the accelerator 116, estimates about the state of the network can be vastly improved. The main benefits of having a presence (the agent 114) in or with the network request origination device such as the user device 102 and/or the network request simulator 118 include the ability to perform measurements that characterize one leg of the session, e.g., measuring just the client-to-server leg latency, etc.

An accelerator 116 sits in the path of the data traffic operating with an application server 108 and executes recommended strategies in addition to gathering and measuring network-related information in real-time. The accelerator 116 may propagate network optimization policies (which, unless specified otherwise, may interchangeably refer to network optimization strategies herein) from the network optimizer 106 to the application server 108, in one embodiment. In another embodiment, the agent 114 may implement one or more network optimization policies from the network optimizer 106.

For example, the optimal number of simultaneous network connections may be propagated as a network optimization policy from the network optimizer 106 through the network 104 to the agent 114 embedded on or with the user device 102 and/or the network request simulator 118. As another example, the transmission rate of file transfer may be limited to 20 MB/sec by the accelerator 116 as a network optimization policy propagated by the network optimizer 106 based on machine learning (e.g., unsupervised learning, supervised learning, etc.) and performance metrics.

The raw network traffic data may be aggregated or processed into (e.g., aggregated, processed, etc.) network traffic data comprising aggregated rows or database records (or traffic data records). Additionally, optionally or alternatively, the collected data may be characterized manually, programmatically, with or without user input, with user input, and so forth, with web page usability information.

In some operational scenarios, aggregated rows such as database records or network traffic data records for a network quality category may be partitioned into different data segments respectively corresponding to different combinations of computer applications (e.g., individual computer applications, individual computer application types, individual computer application names, individual application identifiers, etc.), application servers (e.g., individual application servers serving network requests, etc.), time blocks (e.g., ordered time windows, consecutive time windows, fixed time windows, fixed 24-hours intervals, fixed two-hour intervals, non-fixed time windows, 1-hour time windows in busy hours, 3-hour time windows in non-busy hours, etc.), and so forth.

In some operational scenarios, for accelerated traffic that uses optimized operational parameters in network optimization policies/strategies, each aggregated row representing an accelerated network traffic portion also records performance improvement metrics such as percentage improvement in comparison with non-accelerated traffic (e.g., bypass traffic using default operational parameters without optimization, etc.) in page load performance, data download performance, etc.

3. MEASURING CRITICALITIES

User devices may be operated by end users to run interactive or non-interactive computer applications such as web browsers, mobile applications, desktop applications, etc., that interact with a cloud-based computing system (e.g., a multitenant hosting system, etc.) comprising cloud-based application services, backend servers, database servers, platform servers, etc. In the case of a computer application being a web browser on a user device, the web browser may interact with the cloud-based computing system including the application servers, backend servers, database servers, platform servers, etc., by way of one or more web servers deployed with the cloud-based computing system.

A user device running a computer application may request a collection of data objects to be downloaded from the cloud-based computing system, use the collection of data objects to perform page load operations to render an interactive or non-interactive display page, and interact with an end user operating the user device. Example display pages may include, but are not necessarily limited to only, any of: display pages rendered with non-browser computer applications running locally on user devices, web pages (e.g., WebView pages, etc.) rendered with web browsers running locally on user devices, and so forth.

User experience with a computer application or a display page rendered by the computer application may be determined or greatly affected by download outcomes of the collection of data objects as well as performance of page load operations that render the display page. As used herein, a data object may refer to one or more of: static content/data, a static file, a static data object, dynamic content/data, a dynamically generated file, a dynamically generated data object, etc.

Techniques as described herein can be applied to not only treat/optimize individual network requests and/or corresponding data downloads (e.g., file downloads, content downloads, data object downloads, etc.) independently but also improve/optimize overall page load performance involving combinations of multiple network requests and/or corresponding downloads. These techniques can be used to determine criticalities of data objects and to prioritize traffic for the purpose of improving end outcomes such as page load performance, thereby making a positive impact on end user experience.

Figure 1B:
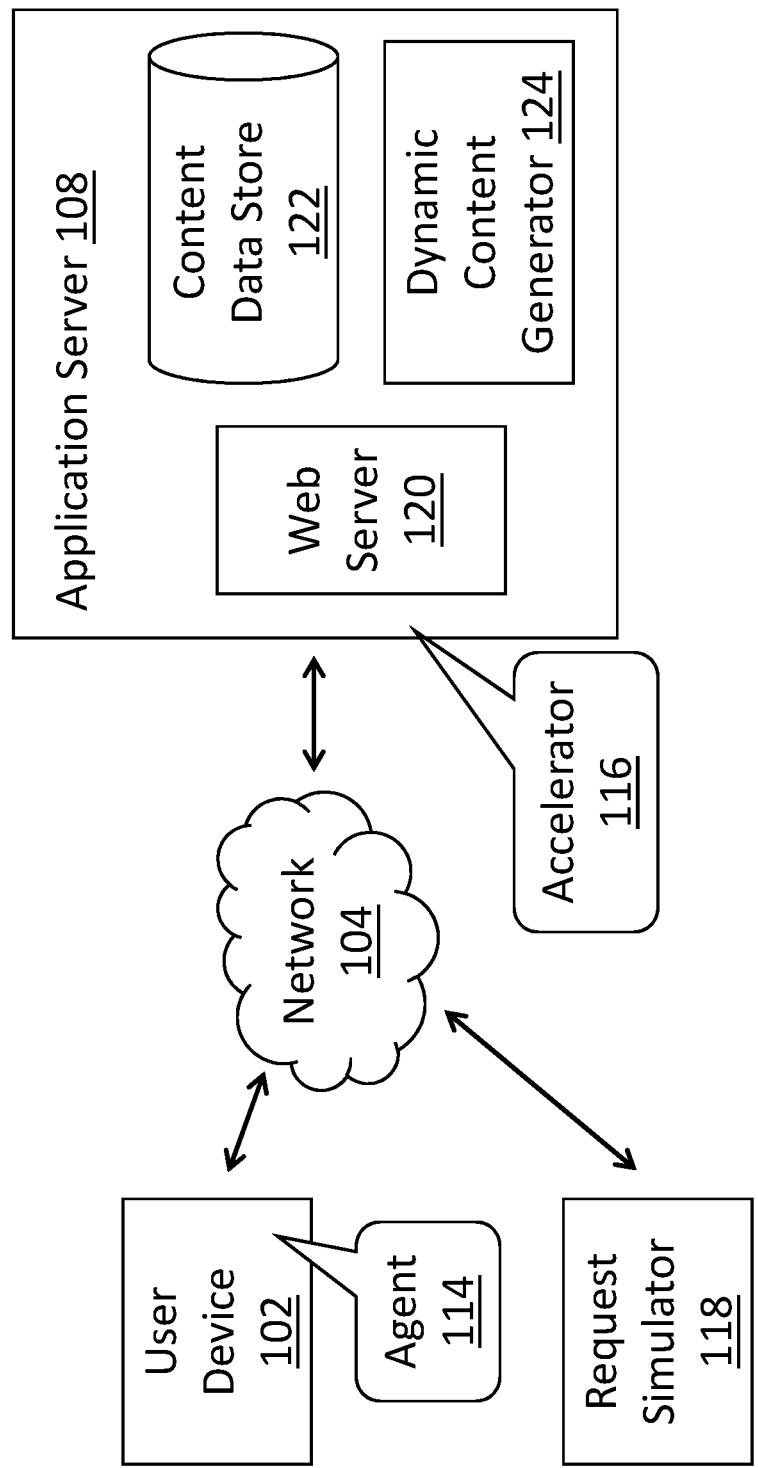
FIG. 1B illustrates an example system for measuring/determining elasticities of data objects.

FIG. 1B illustrates an example block diagram of a system for measuring/determining criticalities of data objects and use the criticalities of the data objects to improve data downloads and overall performance of page load. Some or all of the system and modules therein may be implemented with one or more computing devices.

As illustrated in FIG. 1B, a user device 102 and/or a network request simulator 118 may communicate with one or more application server(s) 108 over one or more network (s) 104. The application server(s) 108 may be a part of cloud-based computing system including but not limited to a multitenant hosting system that hosts a number of organizations, processes a massive volume of network requests from users of the hosted organizations downloads a large number of data objects in response to these network requests, and so forth. The network(s) 104 may include, but are not limited to only, one or more of: the Internet, intranets, local area networks, wide area networks, wired network links, wireless network links, etc.

As used herein, a user device refers to a computing device used by an (end) user to launch or otherwise run a computer application (e.g., web browser, a mobile application or mobile app, a desktop application, etc.) that involves making network requests by the user device to a cloud-based computer system and receiving data downloads as requested by the network requests from the cloud-based computer system. The computer application may have been pre-installed, pre-configured, pre-upgraded, etc., on the user device before the user uses the user device, dynamically downloaded and installed on demand, dynamically launched on demand, etc.

A network request simulator refers to a computing device used by a test user, a developer, a network optimization professional, etc., to launch or otherwise run a computer application (e.g., web browser, a mobile application or mobile app, a desktop application, a simulation tool, "curl" calls, Linux traffic control command "tc", CatchPoint tool commercially available from Catchpoint Systems, Inc., New York, N.Y., etc.) that involves making (e.g., synthetic, sampled, etc.) network requests by the network request simulator to a cloud-based computer system and receiving data downloads as requested by the network requests from the cloud-based computer system.

A computer application—running on the user device 102 and/or the network request simulator 118—that is to render a specific display page may cause the user device and/or the network request simulator to send one or more network requests for one or more specific data objects to the application server(s) 108. A network request as described herein may make a request to download a respective data object in the one or more data objects. Additionally, optionally or alternatively, a network request (e.g., an aggregated network request, etc.) as described herein may make a request for more than one data object.

The one or more specific data objects may represent a collection of data objects used to render the specific display page and comprise any, some or all of: dynamic data objects (e.g., dynamically generated content, dynamically generated objects/files/documents, etc.) or static data objects (e.g., static content, static files/documents, etc.).

In response to receiving the one or more network requests, the application server(s) 108 identify respective data object (s) requested by each of the network requests and determine whether each of the requested data object(s) is a dynamic data object or a static data object. In response to determining that a requested data object by a network request in the one or more network requests is a static data object, the application server(s) may cause the static data object to be retrieved from content data store(s) 122 and downloaded to the user device 102 and/or the network request simulator 118. On the other hand, in response to determining that a requested data object by a network request in the one or more network requests is a dynamic data object, the application server(s) may invoke a dynamic content generator 124, cause the dynamic data object to be generated/constructed by the dynamic content generator 124 and downloaded to the user device 102 and/or the network request simulator 118.

As illustrated in FIG. 1B, the application server(s) 108 may comprise, or otherwise operate in conjunction with, one or more web server(s) 120. In operational scenarios in which the computer application represents a web browser (e.g., a real web browser, web browser or application simulation with "curl" calls, tc, CatchPoint, etc.) running on the user device 102 and/or the network request simulator 118, the web browser may obtain data objects from the application server(s) 108 by way of the web server(s) 120. For example, a web browser as described herein may send a network request for downloading a data object in the form of an HTTP request message directed (e.g., via a universal resource locator or URL, etc.) to a service endpoint of a web server 120 of the application server(s) 108. The web server 120 may invoke an API to retrieve the requested data object as a static data object from the content data store 122 or to cause the dynamic content generator 124 to construct or generate the requested data object dynamically. The requested data object may be downloaded to the web browser using an HTTP response message as a response to the HTTP request message.

Following and/or concurrently with loading a display page (e.g., rendered by a web browser, processed or rendered with a non-browser application/tool, etc.) and/or downloading a data object (e.g., in a collection of data objects used to render a display page, etc.), an agent 114 deployed with the user device 102 and/or the network request simulator 118 may log client-side statistics of data sizes, times, etc., related to loading the display page and/or downloading the data object. Additionally, optionally or alternatively, the application server(s) may log server-side statistics of data sizes, times, etc., related to loading the display page and/or downloading the data object.

In some operational scenarios, outcomes, statuses, annotations (e.g., labels, ground truth, usability scores, etc., based at least in part on test user observations/inputs), etc., of loading the display page and/or downloading the data object such as whether the display page is loaded/rendered, whether an individual data object for the display page is downloaded/received, whether the display page functions (e.g., fully, partly, etc.) correctly, whether the display page is visually correct, etc., may be collected by the agent 114 and/or by the application server(s) 108 automatically and/or with user input from user(s). For example, a test user may provide a completion status (e.g., success, failure, timed out, etc.) and a usability score (e.g., perfect or 5, very good or 4, okay or 3, not good or 2, completely unusable or 1, etc.) on whether the display page is rendered correctly with specific values set for network or TCP parameters, when the test user operates the user device 102 and/or the network request simulator 118 to conduct a page load test on the display page with the specific values set for network or TCP parameters.

The logged client-side and/or server-side statistics, outcomes, statuses, annotations, etc., collected following or concurrently with loading the display page and downloading individual data object(s) for the display page may be used by a system (e.g., a network optimizer, etc.) as described herein to generate database records, for the display page and/or for (e.g., each of, etc.) individual data objects of the display page, to store—in connection with each instance (or each test) of loading the display page and/or loading individual data objects for the display page with same or different values of the network or TCP parameters—page load data such as some or all of page load statuses, page load outcomes, page load throughputs, page load complete times, and page load times to first byte, etc., and download data such as some or all of download statuses, download outcomes, download throughputs, download complete times, and download times to first byte, etc.

4. EXAMPLE DISPLAY PAGES AND DATA OBJECTS

Figure 2A:
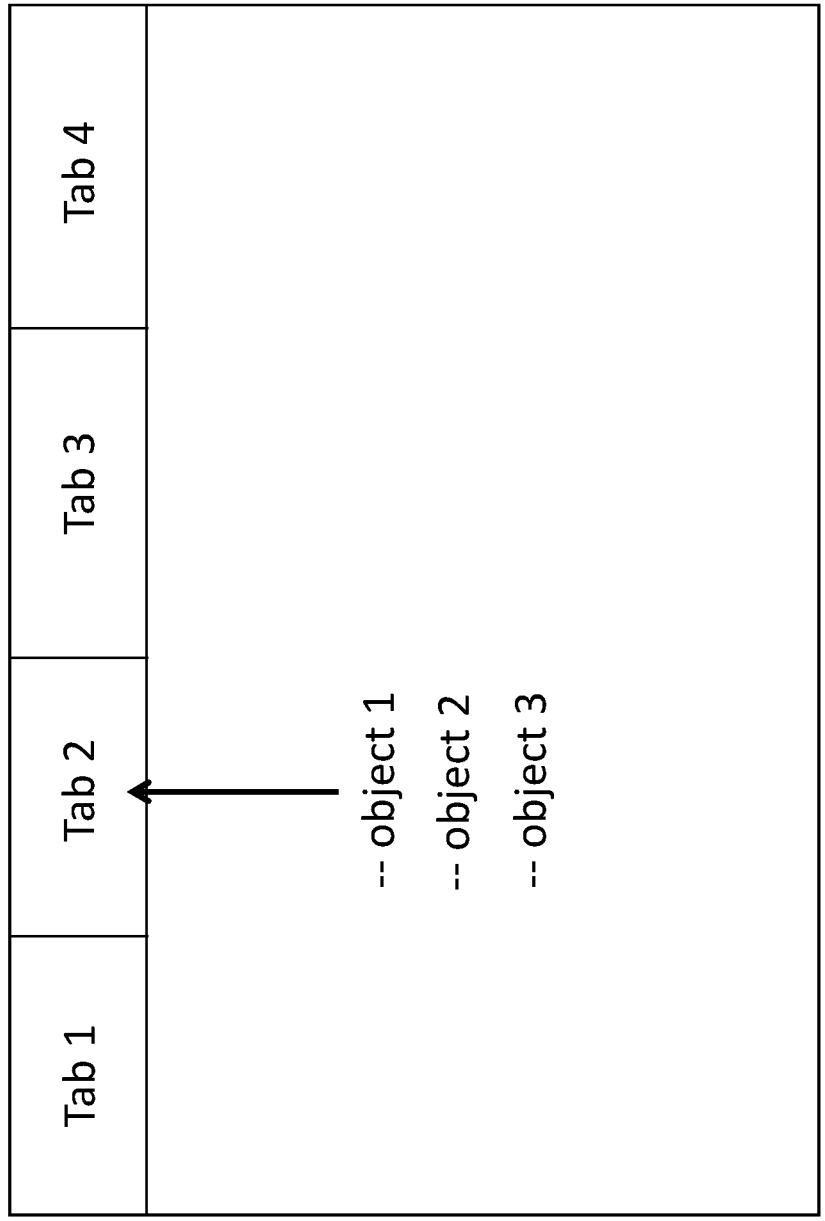
FIG. 2A illustrates an example display page.

FIG. 2A illustrates an example display page that is built and rendered on a display of a user device (or on a display page simulation with a network request simulator)—by a computer application running on the user device (or the network request simulator)—with data objects retrieved from application server(s) (e.g., 108 of FIG. 1B, etc.).

For simplicity, a user device in the discussion herein may refer to a user device operated by an end user as well as a network request simulator operated with test code (e.g., code instrumented to generate test traces, logs etc.), test scripts and/or test user input/control. A display page in the discussion herein may refer to a display page rendered on a display operating in conjunction with a user device operated by an end user as well as a display page simulation with a network request simulator through test code (e.g., code instrumented to generate test traces, logs etc.), test scripts and/or test user input/control.

The computer application that builds the display page may be a mobile app, a desktop application, a web browser, etc., running on the user device. In some operational scenarios, a display page development toolkit/builder such as the Lightning Component framework, commercially available from Salesforce.com Inc., San Francisco, Calif., may be used to build display pages of the computer application. Web components (e.g., Lightning Web Components, etc.) from the display page development toolkit/builder may interoperate with other non-web components (e.g., messaging components, API components, Aura Components, XML/HTTP messaging components, etc.) to obtain underlying data objects to rendering the web components on a display page. In some operational scenarios, a presentation style of a display page may be specified or effectuated with a cascade style sheet (CSS) framework such as the Bootstrap framework to provide pleasant styling, formatting, and layout to the display page. Additionally, optionally or alternatively, customized web components, non-web-components and presentation styles may be designed and implemented with a display page as described herein.

For the purpose of illustration only, the display page as illustrated in FIG. 2A may be a bootstrap page (e.g., a landing page, etc.) used to launch various operational features of the computer application. It should be noted, however, that some or all techniques as described herein may be customized or applied to various use cases that may or may not involve bootstrap display pages.

The techniques as described herein can be applied to determine or estimate criticalities of data objects used in rendering, and enabling operational features of, any of: a boot display page, a non-bootstrap display page, a dashboard page, a customized page, a display page in a set of multiple display pages, a generic display page, a display page provided by a multitenant hosting system, a display page at least in part developed by a hosted organization of a multitenant hosting system, a web page, a non-web display page, and so forth. In addition, the techniques can be applied to use the determined/estimated criticalities of the data objects to prioritize critical and/or blocking data objects for accelerating page loading (time/operations) of the display page that relies on the data objects.

As illustrated in FIG. 2A, the display page may be an interactive page comprising a plurality of visually depicted/rendered user interface (UI) components such as "Tab 1," "Tab 2," "Tab 3," "Tab 4," and zero or more other UI components. Example UI components as described herein may include, but are not necessarily limited to only, any of: web components such as Lightening Web Components, non-web UI components, standard UI components, custom UI components, etc.

Each of some or all of these UI components as illustrated in FIG. 2A may be clicked or selected by a user operating the user device to launch or access respective operational features of the computer applications. For example, these tabs may be used to launch or access operational features such as "Leads", "Reports", "Analytics", etc., implemented or provided with the computer application.

In operational scenarios in which the computer application is provided by a multitenant hosting computing system to a hosted organization in the system, these operational features may comprise standard features implemented and provided by the system as well as custom features at least in part developed and implemented by the hosted organization.

The user may provide user input to the user device to cause the display page to be rendered/depicted. In an example, the user input may be generated with the user's clicking or selection of a UI component such as an icon (e.g., a mobile app icon on a display of the user device, etc.) representing the computer application on the user device. In another example, the user input may be generated with the user's input or selection of a specific URL in the computer application (e.g., a web browser, etc.) on the user device.

In response to receiving the request for rendering the display page, the user device may send one or more network requests for one or more data objects to be used in visually depicting/rendering the display page on the display of the user device. These network requests cause the application server(s) 108 to download the requested data objects to the user device in response to receiving the network requests from the user devices.

FIG. 2B illustrates examples of the data objects to be retrieved for visually depicting/rendering the display page by the user device. In some operational scenarios, the data objects needed by the user device to render the display page comprise a collection of data objects each of which is a static file such as "app.js", "aura_prod.js", "app.css", "app-core.js", "lightning_layout.css", etc.

Some of all the data objects needed by the display page for rendering and/or for operation may have dependency relationships with one another. Additionally, optionally or alternatively, some of all the data objects needed by the display page for rendering and/or for operation may be critical for some or all rendering and operation of the display page. For example, for the bootstrap display page, the static files "app.css" and "aura_prod.js" may be critical for rendering and/or for operation. Without these data objects downloaded properly, the bootstrap display page may be messed up and may provide misleading or incorrect user interface rendering in a way that leads to incorrect operation. By way of comparison, for the bootstrap display page, the static file "app.js" may be non-critical or less critical and may lead to rendering a phantom box (on the display page) that does not show a logo or does not show a non-interactive UI component.

In some operational scenarios, a static file as described herein may be obtained locally in cache from the user device itself if the user device has downloaded the static file previously (e.g., in a previous user session of the computer application with the user device, etc.). In some operational scenarios, a static file as described herein may be obtained from a cache/proxy server (e.g., a CDN edge node, etc.) if the cache server has obtained the static file previously (e.g., from another CDN node/element, from an origin server such as an application server, etc.). As a result, the static file can be looked up (e.g., using a file name for the static file, using a non-API request, using a resource locator, using an identifier, etc.) in cache/memory and returned to the user device or the computer application. Accordingly, download outcomes (e.g., time to first byte, etc.) of a static file as described herein may be relatively stable and may vary only in a relatively narrow range.

To determine or estimate criticalities of the data objects with respect to one or more network optimization parameters, the network requests used by the user device to retrieve these data objects and corresponding data downloads may be made and/or processed with different time delay values (e.g., a range from zero or little time delay to infinite delay, a subrange of time delays, etc.).

For example, a subset of network requests used by the user device to retrieve a data object of a display page and corresponding data download(s) may be made and/or processed with different values of (e.g., extra, inserted, etc.) time delays (e.g., a range from zero or little time delay to infinite delay, a subrange of time delays, etc.). In some operational scenarios, other subsets of network requests used by the user device to retrieve other data objects of the display page and corresponding data download(s) may be made and/or processed as usual with no or little time delays. In some other operational scenarios, at least one other subset of network requests used by the user device to retrieve one other data object of the display page and corresponding data download(s) may be made and/or processed different values of (e.g., extra, inserted, etc.) time delays (e.g., a range from zero or little time delay to infinite delay, a subrange of time delays, etc.).

Client-side and/or server-side statistics, outcomes, statuses, annotations, etc., may be collected following or concurrently with loading the display page and downloading the data objects for the display page and used by a system (e.g., a network optimizer, etc.) as described herein to generate database records, for the display page and/or for (e.g., each of, etc.) the data objects of the display page, to determine the criticalities of each of some or all of the data objects, to use the criticalities of the data objects to set a specific data object download order as a part of network optimization policies/strategies to be individually and/or collectively implemented by user devices, application servers, etc., in future network requests and corresponding data downloads for the data objects of the display page.

For example, to determine or estimate a criticality of the data object "app.js" with respect to the display page, network requests used by the user device to retrieve the data object "app.js" and corresponding data downloads may be made and/or processed with different values of time delays.

Client-side and/or server-side statistics, outcomes, statuses, annotations, etc., may be collected for the data objects of the display page including but not limited to the data object "app.js", and used to determine the criticality of the data object "app.js" with respect to the display page, to set a specific data object download order as a part of network optimization policies/strategies to be individually and/or collectively implemented by user devices, application servers, etc., in future network requests and corresponding data downloads for the data object objects of the display page.

The foregoing operations may be similarly extended/applied to other data objects such as "aura_prod.js", "app.css", "appcore.js", "lightning_layout.css", etc., in the data objects for the display page.

In some operational scenarios, the display page of FIG. 2A may be used by the user to access or launch additional operational features of the computer application. For example, the user may click or select the UI component "Tab 2" to launch a second display page (not shown) in the form of a relatively lengthy report as an operational feature provided by the computer application. The clicking or selection of the UI component "Tab 2" causes the user device to send a second collection of network requests to the application server(s) 108 for downloading a second collection of data objects from the application server(s) 108 to the user device.

FIG. 2C illustrates examples of the second collection of data objects to be retrieved for visually depicting/rendering the second display page by the user device. In some operational scenarios, the second collection of data objects needed by the user device to render the second display page comprises dynamic data objects (as illustrated in FIG. 2A) such as "object 1," "object 2," "object 3," etc., some or all of which may be dynamic data objects.

The network requests made by the user device for retrieving the second collection of data objects from the application server(s) 108 may be encapsulated or represented in one or more API calls (e.g., implemented with a Salesforce.com Lightning web component and/or Aura component, "window.postMessage( )", etc.) or one or more XML HTTP post messages (e.g., URL with sub-path expression "/aura_?<params>", etc.).

For the purpose illustration only, as shown in FIG. 2C, the network requests may be represented by XML HTTP Requests (XHRs) such as "XHR1→object 1," "XHR2→object 2," "XHR3→object 3," etc., for the data objects "object 1," "object 2," "object 3," etc., in the second collection of data objects used to rendered the second display page ("non-bootstrap page") on the user device. These XHRs cause respective actions to be performed at the application server(s) 108 that receive the XHRs. Different display pages or UI components therein may cause different actions to be invoked or performed at the application server(s) 108. Each such action may translate to corresponding work performed by an application server 108 such as authentication and/or authorization based on user credentials, determination of the user's access level, database queries, generation and construction of one or more data objects or components to be returned to the user device, other computations, etc.

In some operational scenarios, data object(s) returned for a display page may include not only data/content directly rendered or depicted on the display page but also (e.g., attendant, additional, etc.) data/content that may be rendered or depicted on a subsequent or related display page (e.g., a second page of a relatively long report, etc.). Additionally, optionally or alternatively, data/content not rendered or depicted on the display page—but which is needed or to be used for performing an operation, for example if and when the user selects or clicks a corresponding UI component—in connection with or accessible on the display page may be returned by the application server(s) 108 to the user device in the data objects for the display page.

Depending on outcomes of the XHRs, the second display page is rendered or painted with UI components constructed/generated based on received data objects or components such as "object 1," "object 2," "object 3", etc. For example, these data objects may return a set of opportunities, contacts, etc., which the user is authenticated and authorized to access based on the user's access level, position, job responsibilities, etc., in an organization.

Results, scopes and/or amounts of data/content in a data object may be dependent on user profiles dependent. A user such as a manager, a vice president, a senior professional, a support staff member, etc., may access only a corresponding result, scope and/or amount of data/content in the data object dependent on the user's profile, role, access level. Additionally, optionally or alternatively, results, scopes and/or amounts of data/content in a data object may vary among different user devices (e.g., more data may be returned to a desktop computer than to a mobile phone, etc.), users, departments, organizations, regions, geographic locations, etc. In an example, if the user is responsible for a specific part of a service cloud, then custom service cases for the specific part of the service cloud may be returned in one or more data objects for a display page as described herein. In another example, if the user is responsible for a specific region, then custom service cases for the specific region may be returned in one or more data objects for a display page as described herein.

To determine criticalities of data objects of the second display page, the network requests used by the user device to retrieve these data objects and corresponding data downloads may be made and/or processed with different values of time delays.

Client-side and/or server-side statistics, outcomes, statuses, annotations, etc., may be collected following or concurrently with loading the second display page and downloading the second collection of data objects for the second display page and used to generate database records, for the second display page and/or for (e.g., each of, etc.) the second collection of data objects of the second display page, to determine the criticalities of each of some or all of the second collection of data objects with respect to the second display page, to use the criticalities of the second collection of data objects to determine a specific data object download order, to propagate the specific data object download order as a part of network optimization policies/strategies to be individually and/or collectively implemented by user devices, application servers, etc., in future network requests and corresponding data downloads for the second collection of data objects for the second display page.

For example, to determine or estimate a criticality of a dynamic data object "object 1" (e.g., in the second collection of data objects, etc.) with respect to the second display page, a subset of network requests used by the user device to retrieve the data object "object 1" and corresponding data downloads may be made and/or processed with different values of time delays.

Client-side and/or server-side statistics, outcomes, statuses, annotations, etc., may be collected for the data objects of the second display page and used to determine the criticality of the data object "object 1" with respect to the second display page, to use criticalities of the data objects including the data object "object 1" to determine a specific data object download order, to propagate the specific data object download order as a part of network optimization policies/strategies to be individually and/or collectively implemented by user devices, application servers, etc., in future network requests and corresponding data downloads for the data objects of the second display page.

Download outcomes (e.g., time to first byte, etc.) of a dynamic data object as described herein may be relatively dynamic and may vary in a relatively large range. A dynamic data object resulting in a relatively long report may lead to a relatively long time for completion for downloading the data object. Additionally, optionally or alternatively, a dynamic data object may not be served from cache but rather may be generated/constructed by an application server operating in conjunction with a number of backend devices/servers. As a result, download outcomes of the dynamic data object may vary relatively significantly, depending on influence factors such as users, user devices, access service network, organizations, data/content type (e.g., text, audio, video, image, etc.), display pages, computer applications, geographic and/or network locations of user devices, geographic and/or network location of application server(s), etc. A criticality of the dynamic data object may be relatively complex and may be determined using simulation tools used to simulate network requests and cause corresponding data downloads with different (e.g., candidate, sampled from a probability distribution or its corresponding sufficient statistics as stored in a database, available, possible, etc.) values in each of some or all of the influence factors.

For the purpose of illustration only, it has been described that a (e.g., single, etc.) network request such as an API call, an HTML message, etc., may be made to an application server to cause a corresponding (e.g., single, etc.) data object to be downloaded to a network request origination device such as a user device, a network request simulator, etc. It should be noted that, in various embodiments, a network request as described herein may be made to an application server to cause multiple corresponding data object to be downloaded to a network request origination device such as a user device, a network request simulator, etc.

In some operational scenarios, page load performance metrics such as page load statuses (e.g., binary, etc.), page load times (e.g., in seconds, in milliseconds, etc.), etc., of a display page may be used to determine or estimate criticalities of data objects needed by the display page, identify a subset of data objects in a critical path of rendering and operating with the display page, and to determine a specific data object download order that prioritizes data object downloading based on the criticalities of the data objects.

Example criticalities of a data object with respect to a display page as described herein may include, but are not necessarily limited to only, one of: the data object is critical (or is essential) to loading and operating with the display page, the data object is not critical (or is non-essential), and so forth. A system as described herein may use one or more of a variety of different (e.g., criticality, essentiality, etc.) evaluation factors to evaluate, determine and/or estimate a criticality of a data object with respect to a display page. In various operational scenarios, a failure or an untimely delay of downloading a data object may lead to a failure of loading a display page, an excruciatingly long time (exceeding a maximum display page loading time threshold) in loading a display page, broken functionality of a display page or any UI components/controls therein, an incorrect look of a displayed form, incorrect operations with displayed data fields, user encountering operational failures in connection with a display page, etc.

In some operational scenarios, if the data object causes the display page to fail to load, then the data object is deemed to be a critical object of the display page. Otherwise, if the data object does not prevent the display page from being loaded (e.g., even with a phantom box caused by the missing or delayed data object, then the data object is deemed to be a non-critical object of the display page.

In some operational scenarios, if the data object causes the display page to fail to load, causes the display page to fail to interact with a user as intended for the display page, or causes the display page to load with a missing operational feature (e.g., a first report page is shown but a second report page is not shown if a user chooses to scroll down, etc.) or with a missing or non-functional UI component (e.g., a phantom box, an non-operational UI control, etc.), then the data object is deemed to be a critical object of the display page. Otherwise, the data object is deemed to be a non-critical object of the display page.

In some operational scenarios, if the data object causes the display page to fail to load or tends to cause the display page to load with time delay beyond a maximum time delay threshold, then the data object is deemed to be a critical object of the display page. Otherwise, the data object is deemed to be a non-critical object of the display page.

In some operational scenarios, a criticality score may be evaluated, determined and/or estimated for a critical object by the system based on a severity of impacts from a failure and an untimely download of the critical object. For example, if the critical object is determined to cause more time delays than another critical object, the former critical object may be assigned with a higher criticality score than that assigned with the latter critical object. If the critical object is determined to cause usability issues (e.g., non-operational, slowness, missing operational features, etc.) of the display page with more user devices, more access networks, more occurrences, etc., the former critical object may be assigned with a higher criticality score than that assigned with the latter critical object.

Additionally, optionally or alternatively, a system as described herein may use one or more of a variety of different (e.g., blocking, etc.) evaluation factors to evaluate, determine and/or estimate whether a data object of a display page is a blocking data object. The system may determine whether the data object is a blocking object to the display page, to one or more data objects, to one or more operational features, to one or more UI components, to one or more user interactive components/functions/operations, and so forth. In an example, in response to determining that a failure or a delay of downloading the data object blocks rendering and/or operating with the display page, the data object is deemed to be a blocking object. In another example, in response to determining that a failure or a delay of downloading the data object one or more other data objects from being downloaded for rendering and/or operating with the display page, the data object is deemed to be a blocking object.

In some operational scenarios, computer codes/scripts implemented with a computer application (including but not limited to a simulation of the computer application by simulation tools) and/or computer codes/scripts implemented with application servers/services interacting with the computer application may be instrumented and/or embedded with test codes/scripts that allow network requests for each of a collection of data objects of a display page to be set with different values of time delays.

A system as described herein may add (e.g., constant, variable, etc.) time delays in network requests in a set of tests or simulations of rendering and/or operating with a display page of a computer application. For example, a constant time delay may be incrementally added to downloading a data object in a sequence/set of page load tests (or simulated page load tests). While time delays (e.g., k milliseconds where k is a positive integer and where k may be varied, etc.) are being inserted or added in downloading the data object in these tests, other data objects may be downloaded without being inserted or added time delays. The sequence of page load tests with incremental time delays may be used to identify if and when a time-delayed download of the data object breaks usability of a display page being loaded in these tests, identify which specific type(s) of suability problems, identify a metric to be used as a basis to determine a usability score and/or a criticality score, etc. The time delays and/or tests may be repeated and varied to obtain a relatively confident estimate of a criticality of the data object with respect to the display page.

Additionally, optionally or alternatively, to determine whether a data object is a blocking object, a system as described herein may run a sequence/set of page load tests (or simulated page load tests) in which the data object of the display page is blocked (e.g., setting corresponding time delay in downloading the data object to infinity, etc.) from being downloaded. For example, each data object in a display page may be (e.g., serially, in turn, randomly, orderly, etc.) explicitly blocked from being downloaded, while other data objects are not explicitly blocked from being downloaded. The page load tests can be used to determine effects of blocking the data object, to determine what would happen to the display page or any other data object thereof, to identify which of the data objects in the display page are blocking objects.

This information such as criticalities of data objects and identities of blocking data objects amongst the data objects in display page can be used to identify a critical path for downloading some or all the data objects of the display page and use the critical path to generate a specific data object download order that prioritize or re-prioritize downloads of critical and/or blocking data objects.

In some operational scenarios, an individual test or simulation of slowing or blocking the data object may be performed while other influence factors and/or external conditions (e.g., user device, access network, no extra delay or block to other data objects of the display page, etc.) are held to be constant. Since other influence factors and/or external conditions are maintained to be the same when the data object is being slowed and blocked, results of such tests/simulations can reveal (or can be used to infer) whether the data object is a critical (or essential) object, a non-critical (or non-essential) object, a blocking object, and so forth.

Additionally, optionally or alternatively, some or all of these tests/simulations can reveal (or can be used to infer) whether any other specific data object (e.g., object B, object 2, etc.), any specific UI component, any specific operational feature, etc., of the display page depends on the data object (e.g., object A, object 1, etc.) being successfully and/or timely downloaded, whether any other specific data object (e.g., object B, object 2, etc.), any specific UI component, any specific operational feature, etc., of the display page is blocked or become non-functional if the data object is not successfully and/or timely downloaded, etc.

5. PRIORITIZING CRITICAL OBJECTS FOR DOWNLOADING

Figure 3:
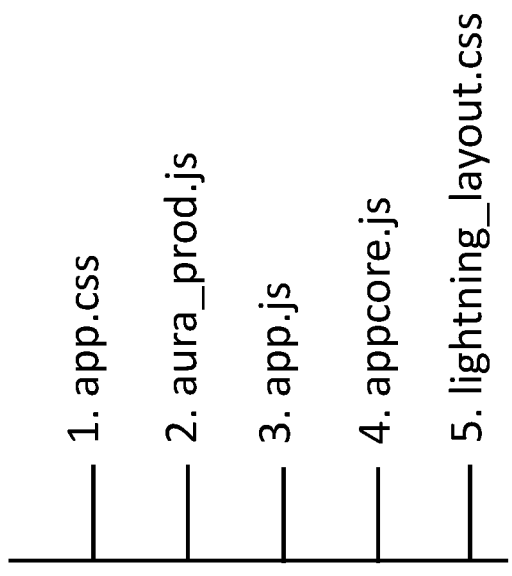
FIG. 3 illustrates an example data object download order for downloading data objects.

FIG. 3 illustrates an example data object download order for downloading data objects used for rendering or operating with a display page of a computer application (e.g., a web browser, a mobile app, a desktop application, etc.). For the purpose of illustration only, the data object download order is an ascending order in which the lower the order number of a data object, the higher in priority for downloading the data object.

The data object download order may be at least in part implemented or enforced in the computer application by executable code/script in connection with (e.g., embedded with, etc.) the display page or the computer application. Additionally, optionally or alternatively, the data object download order may be at least in part implemented or enforced with one or more servers (e.g., application servers, other servers operating in conjunction with the application servers, etc.) that provide application services to the computer application, processes network requests from the computer application, download the requested data objects to the computer application, etc.

Criticalities of data objects of a display page—which indicate whether a given data object for rendering and operating with the display page is a critical object, a non-critical object, a blocking object, a blocked object, etc.— may be used to determine a critical path for downloading the data objects of the display page. For example, in the example bootstrap display page as illustrated in FIG. 2A, the data objects "app.css" and "aura_prod.js" may be critical for rendering and/or operating with the display page. Without these data objects downloaded properly, the bootstrap display page may be messed up and may provide misleading or incorrect user interface rendering in a way that leads to incorrect operation. By comparison, the data object "app.js" and other data objects may be a less critical or a non-critical object. Thus, in the example data object download order of FIG. 3, the data objects "app.css" and "aura_prod.js" are assigned higher priorities than other data objects.

Among the critical objects, the data object "app.css" may be critical to rendering and operating with widgets to be depicted on the right-hand-side of the bootstrap display page; but may not block other data objects from being downloaded, may not block the display page from being loaded, may not block other data objects from being correctly used by UI components/controls of the display page, etc. By way of comparison, the data object "aura_prod.js" may be critical for rendering and/or operating with the display page; for example, may block other data objects from being downloaded, may block the display page from being loaded, may block other data objects from being correctly used by UI components/controls of the display page, etc. Thus, in the example data object download order of FIG. 3, the data object "aura_prod.js" is assigned a higher priority than the data object "app.css". Other non-critical objects may be ranked below the critical data objects in accordance with their respective criticality scores among themselves.

In some operational scenarios, a non-critical and/or non-blocking data object of a display page may become a critical and/or blocking data object of a subsequent display page. For example, a data object that supports scrolling down may not be a critical and/or blocking data object for a first display page but may become a critical and/or blocking data object for a second display page subsequent to the first display page.

In some operational scenarios, in response to determining that the second display page is an anticipated (e.g., frequently, corresponding to an anticipated user action, etc.) subsequent page, the data object may be deemed as a critical but non-blocking object of the first display page. Thus, a criticality (e.g., true or false, a criticality score, etc.) a data object may increase with respect to a display page in response to determining that the data object is (relatively highly) likely to cause criticality issues to a subsequent display page or to a relatively frequently anticipated operation associated with the display page. In some operational scenarios, a critical object to a highly frequent subsequent display page may be elevated to be a critical object with respect to a preceding display page.

The critical path of downloading the data objects for the display page can be identified based at least in part on the criticalities of the data objects for rendering and operating with the display page.

The critical path may be used to generate a specific data object download order to ensure first downloading critical and/or blocking data objects of the display page before other data objects of the display page so as not to break end user experience in connection with the display page. For example, for the display page of FIG. 2A, the specific data object download order as shown in FIG. 3A may be used to ensure first downloading the critical data objects "app.css" and "app_prod.js" before downloading other (e.g., non-critical, non-essential, etc.) data objects of the display page. In some operational scenarios, a specific data object download order generated based on knowledge of a critical path in data objects as described herein can be used to better leverage available capability of networks and devices involved in processing network requests for the data objects and corresponding data downloads for the data object.

Instead of and/or in addition to optimizing individual downloads of the data objects and treating network requests and data downloads independently, techniques as described herein can be implemented to detect/recognize/learn critical and/or blocking data objects that prevent or adversely impact a user's interactions and operations with the display page or the computer applications, to use data object criticality/blocking information to optimize processing or scheduling these network requests and corresponding data downloads as a whole, and to improve the probability of a successful page load while minimizing page load time. As a result, end user experience with the display page and the computer application is enhanced or maximized, for example in operational scenarios in which user devices operate with relatively limited available network capacity and relatively high service quality variability in areas covered by relatively low quality access networks, wireless networks, wired networks, etc.

6. NETWORK OPTIMIZATION INCORPORATING CRITICALITY INFORMATION

As previously noted, client-side and/or server-side statistics, outcomes, statuses, annotations, etc., may be collected following or concurrently with loading a display page and downloading data objects for the display page and used by a system (e.g., a network optimizer, etc.) as described herein to generate database records, for the display page and/or for (e.g., each of, etc.) the data objects of the display page.

The database records may be analyzed by some or all of network optimization professionals, network optimization systems, machine learners, etc., to determine criticalities of each of some or all of the data objects with respect to the display page.

By way of example but not limitation, a machine learner (or a learning machine) may implement (e.g., unsupervised, supervised, etc.) machine learning algorithm/model. Here, "supervised learning" may refer to providing to and training a learning machine (or machine learner) with, datasets comprising labels or ground truth indicating desired outputs as labeled. An example dataset used by supervised learning as described herein is a set of data records or data traffic records comprising respective labels or ground truth (e.g., estimated/determined by unsupervised learning, etc.) indicating respective traffic shares in the data records or data traffic records as "existence of web page usability problem (s)," "no existence of web page usability problem(s)," a score for a specific web page usability problem. In contrast, "unsupervised learning" may refer to learning structures/features from, datasets comprising no labels or ground truth indicating desired outputs. An example dataset used by unsupervised learning as described herein is network traffic data (e.g., page load performance data, download outcomes, etc.) without some or all information about web page usability.

The machine learner may use a training dataset in the form of database records comprising client-side and/or server-side statistics, outcomes, statuses, annotations, etc., as training instances to train one or more machine learning algorithm/models for determining relationships (or data models) between data outcomes of a data object in relation to various different values of time delays for the purpose of determining a criticality of the data object with respect to the display page or other data objects thereof. The machine learner may be implemented with one or more computing devices.

In some operational scenarios, display-page-specific machine learning as described herein may be performed. The machine learner may retrieve, from an overall training dataset, a subset of training instances/records specific to a display page or a web page, for example based on page identifier/name. The subset of training instances/records may be used to determine criticalities of data objects in connection with the display page. Additionally, optionally or alternatively, training instances/records specific to similar display pages (e.g., a desktop display page that is similar to a mobile app display page under criticality machine learning, etc.) may be also be used to help determine criticalities of data objects in connection with the display page.

As the data object may be a dynamic or static object, network request simulations as well as the machine learner may take that into account in generating simulated (or sampled) network requests based on different options/values of some or all influence factors as well as in determining the criticality of the data object with respect to the display page or other data objects thereof.

For a dynamic data object, a system providing computing application service such as an application server may take relatively different amounts of times to generate the same dynamic data object for different network requests of the same dynamic data object, as compared with a static data object. In addition, the same dynamic data object may produce relatively large variances in download times for different network requests of the same dynamic data object, as compared with a static data object.

In some operational scenarios, as compared with a static object, more data records and/or more training instances may be generated for determining a criticality of a dynamic data object including but not limited to determining when and which data object will block rendering and operations in relation to one or more display pages or data objects thereof. For example, for static files, it may be possible to estimate or predict the criticalities, as deviations from their normally relatively narrow range of download outcomes can be easily recognized or learned. For dynamic content, however, it is not straightforward to estimate criticality a priori. A computer application or a web page may be launched or tested multiple times against various network conditions, for example using traffic control and simulation tools such as "tc" or "CatchPoint" with a range of possible values (e.g., a range of maximum burst size values, etc.) for each downloaded data object in the dynamic content. Results obtained from data downloads with different possible values of time delays and/or different options/values of influence factors may be used to relatively accurately and reliably determine a metric of a criticality of a data object.

Knowledge of object/traffic criticality can be used by a system as described herein to prioritize object/traffic with a specific data object download order, for example through machine learning. As used herein, traffic criticality may refer to an individual criticality of a data object as well as an overall criticality of one or more data objects represented in network traffic or a portion thereof. Example machine learning can be found in U.S. patent application Ser. No. 16/775,807, with an application title of "MACHINE LEARNING BASED END TO END SYSTEM FOR TCP OPTIMIZATION" by Tejaswini Ganapathi, Satish Raghunath and Shauli Gal, filed on Jan. 29, 2020, 2020, the entire contents of which are hereby incorporated by reference as if fully set forth herein.

7. EXAMPLE EMBODIMENTS

Figure 4:
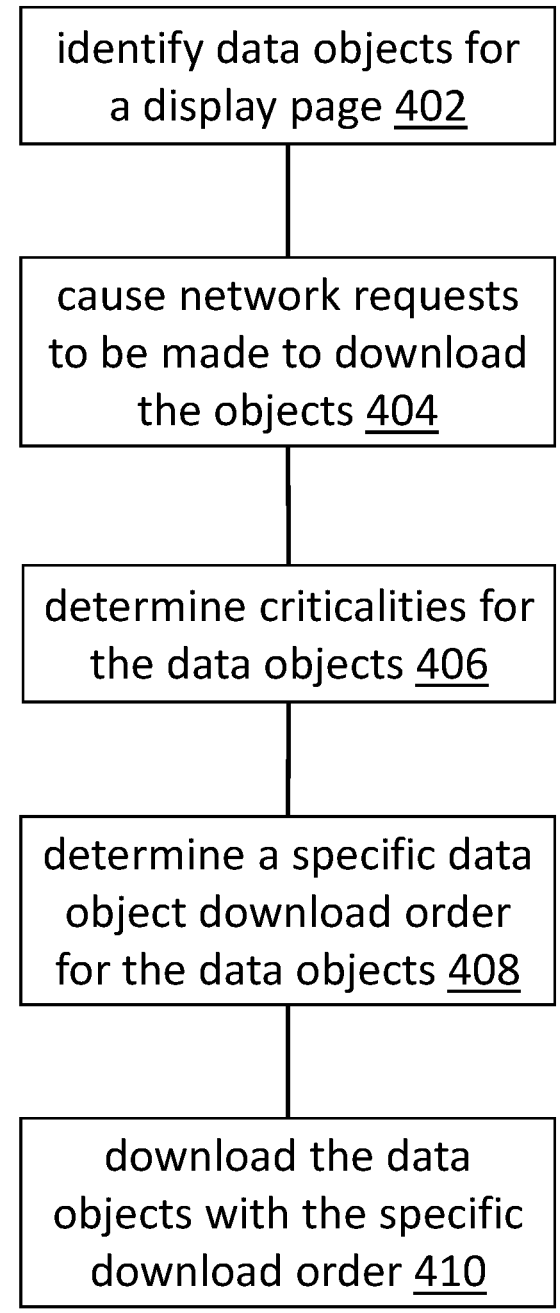
FIG. 4 illustrates an example process flow.

FIG. 4 illustrates an example process flow that may be implemented by a computing system (or device) as described herein. In block 402, a system as described herein identifies a plurality of data objects to be downloaded for a display page.

In block 404, the system causes a plurality of sets of network requests to be made to download the plurality of data objects. Each set of network requests in the plurality of sets of network requests is used to download a respective data object in the plurality of data objects with a set of different time delays in a range of time delays. Each network request in each such set of network requests is made to download the respective data object with a respective time delay in the set of different time delays.

In block 406, the system determines, based at least in part on the plurality of sets of network requests, a plurality of criticalities for the plurality of data objects. Each criticality in the plurality of criticalities corresponds to a respective data object in the plurality of data objects. Each such criticality indicates whether the respective data object is capable of causing the display page to be unusable.

In block 408, the system determines a specific data object download order based at least in part on the plurality of criticalities for the plurality of data objects. The specific data object download order prioritizes downloading critical data objects in the plurality of data objects. The plurality of criticalities indicates that each of the critical data objects is capable of causing the display page to be unusable.

In block 410, the system causes one or more user devices to download the plurality of data objects for the display page with the specific data object download order.

In an embodiment, the display page is determined to be unusable in response to determining that an operational feature with the display page does not work.

In an embodiment, the plurality of criticalities identifies s set of one or more data objects in the plurality of data objects as one or more blocking objects. The specific data object download order prioritize downloading the one or more blocking objects over one or more non-blocking objects in the plurality of data objects.

In an embodiment, the one or more blocking objects prevent at least one other data object from being downloaded.

In an embodiment, the one or more blocking objects prevent the display page from being loaded.

In an embodiment, a subset of time delays is added only for a specific set of network requests for downloading a specific data object in the plurality of data objects, without adding time delays for other sets of network requests for downloading other data objects in the plurality of data objects.

In an embodiment, at least one network request in the plurality of sets of network requests is a simulated network request made with a simulation tool.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

8. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
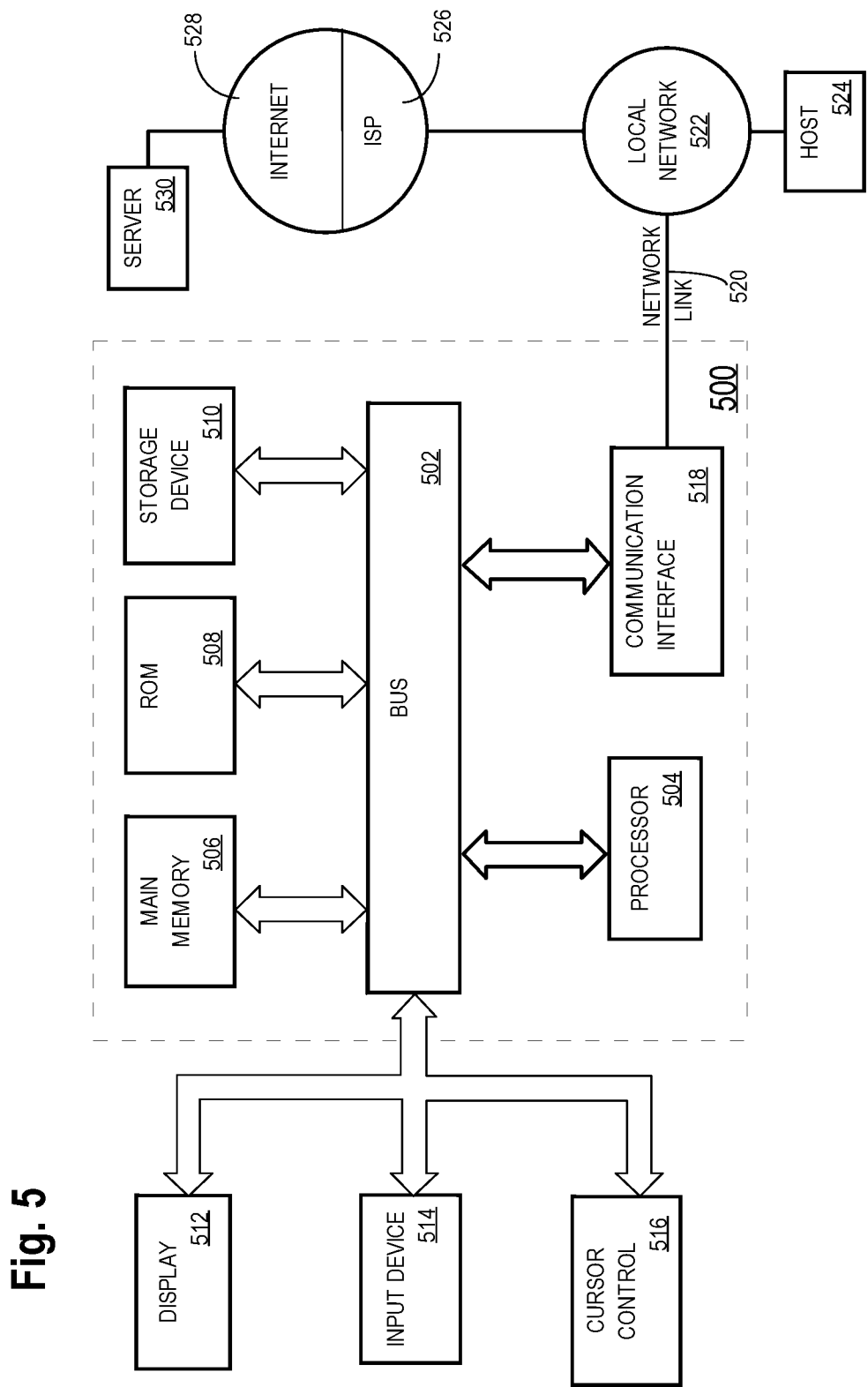
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   identifying a plurality of data objects to be downloaded for a display page;
   for each data object in the plurality of data objects, performing:
      blocking the said data object from being downloaded while causing a set of one or more network requests to be made to download a different set of one or more data objects in the plurality of data objects, wherein the different set of one or more data objects include all data objects in the plurality of data objects excluding the said data object;
      determining, based at least in part on the set of one or more network requests, whether said data object is a blocking data object, by determining whether a failure of downloading said data object blocks at least one data object, in the different set of one or more data objects, from being downloaded;
   determining a specific data object download order based at least in part on whether each data object in the plurality of data objects is said blocking data object;
   causing one or more user devices to download the plurality of data objects for the display page with the specific data object download order.

2. The method as recited in claim 1, wherein the display page is determined to be unusable in response to determining that an operational feature with the display page does not work.

3. The method as recited in claim 1, wherein the plurality of data objects includes one or more blocking objects, wherein the specific data object download order prioritize downloading the one or more blocking objects over other objects in the plurality of data objects.

4. The method as recited in claim 3, wherein each of the one or more blocking objects prevents at least one other data object on the same display page from being downloaded.

5. The method as recited in claim 3, wherein the one or more blocking objects prevent the display page from being loaded.

6. The method as recited in claim 1, wherein at least one network request in the set of one or more network requests is a simulated network request made with a simulation tool.

7. The method as recited in claim 1, wherein the plurality of data objects comprises one or more of: web components, user interface (UI) components built with a display page development toolkit, non-web components, messaging components, application programming interface components, underlying data objects used to render UI components, or cascade style sheet (CSS) files related to styling, formatting and layout of the display page.

8. A non-transitory computer readable medium storing a program of instructions that is executable by a device to perform;
   identifying a plurality of data objects to be downloaded for a display page;
   for each data object in the plurality of data objects, performing:
      blocking the said data object from being downloaded while causing a set of one or more network requests to be made to download a different set of one or more data objects in the plurality of data objects, wherein the different set of one or more data objects include all data objects in the plurality of data objects excluding the said data object;
      determining, based at least in part on the set of one or more network requests, whether said data object is a blocking data object, by determining whether a failure of downloading said data object blocks at least one data object, in the different set of one or more data objects, from being downloaded;
   determining a specific data object download order based at least in part on whether each data object in the plurality of data objects is said blocking data object;
   causing one or more user devices to download the plurality of data objects for the display page with the specific data object download order.

9. The non-transitory computer readable medium as recited in claim 8, wherein the display page is determined to be unusable in response to determining that an operational feature with the display page does not work.

10. The non-transitory computer readable medium as recited in claim 8, wherein the plurality of data objects includes one or more blocking objects, wherein the specific data object download order prioritize downloading the one or more blocking objects over other objects in the plurality of data objects.

11. The non-transitory computer readable medium as recited in claim 10, wherein each of the one or more blocking objects prevents at least one other data object on the same display page from being downloaded.

12. The non-transitory computer readable medium as recited in claim 10, wherein the one or more blocking objects prevent the display page from being loaded.

13. The non-transitory computer readable medium as recited in claim 8, wherein at least one network request in the set of one or more network requests is a simulated network request made with a simulation tool.

14. The non-transitory computer readable medium as recited in claim 8, wherein the plurality of data objects comprises one or more of: web components, user interface (UI) components built with a display page development toolkit, non-web components, messaging components, application programming interface components, underlying data objects used to render UI components, or cascade style sheet (CSS) files related to styling, formatting and layout of the display page.

15. An apparatus, comprising:
   one or more computing devices;
   a non-transitory computer readable medium storing a program of instructions that is executable by the one or more computing devices to perform:
   identifying a plurality of data objects to be downloaded for a display page;
   for each data object in the plurality of data objects, performing:
      blocking the said data object from being downloaded while causing a set of one or more network requests to be made to download a different set of one or more data objects in the plurality of data objects, wherein the different set of one or more data objects include all data objects in the plurality of data objects excluding the said data object;

determining, based at least in part on the set of one or more network requests, whether said data object is a blocking data object determining whether a failure of downloading said data object blocks at least one data object, in the different set of one or more data objects, from being downloaded;

determining a specific data object download order based at least in part on whether each data object in the plurality of data objects is said blocking data object;

causing one or more user devices to download the plurality of data objects for the display page with the specific data object download order.

16. The apparatus as recited in claim 15, wherein the display page is determined to be unusable in response to determining that an operational feature with the display page does not work.

17. The apparatus as recited in claim 15, wherein the plurality of data objects includes one or more blocking objects, wherein the specific data object download order prioritize downloading the one or more blocking objects over other objects in the plurality of data objects.

18. The apparatus as recited in claim 17, wherein each of the one or more blocking objects prevents at least one other data object on the same display page from being downloaded.

19. The apparatus as recited in claim 17, wherein the one or more blocking objects prevent the display page from being loaded.

20. The apparatus as recited in claim 15, wherein at least one network request in the set of one or more network requests is a simulated network request made with a simulation tool.

* * * * *